US008610795B2

(12) United States Patent
Kondo

(10) Patent No.: US 8,610,795 B2
(45) Date of Patent: Dec. 17, 2013

(54) SOLID-STATE IMAGING APPARATUS FOR SUPPRESSING NOISE

(75) Inventor: Toru Kondo, Hino (JP)

(73) Assignee: Olympus Corporation, Tokyo (JP)

( * ) Notice: Subject to any disclaimer, the term of this patent is extended or adjusted under 35 U.S.C. 154(b) by 1008 days.

(21) Appl. No.: 12/235,151

(22) Filed: Sep. 22, 2008

(65) Prior Publication Data

US 2009/0079849 A1     Mar. 26, 2009

(30) Foreign Application Priority Data

Sep. 25, 2007 (JP) ................................ 2007-246725

(51) Int. Cl.
*H04N 5/76* (2006.01)
*H03M 1/12* (2006.01)

(52) U.S. Cl.
USPC ...................................... 348/231.99; 348/155

(58) Field of Classification Search
USPC .............. 348/231.99, 308, 249, 297; 341/155
See application file for complete search history.

(56) References Cited

U.S. PATENT DOCUMENTS

| 4,354,169 | A | * | 10/1982 | Nossek | ........................... | 333/173 |
| 6,215,520 | B1 | * | 4/2001 | Taniji | ............................. | 348/249 |
| 7,723,661 | B2 | * | 5/2010 | Hara et al. | ................. | 250/208.1 |
| 2002/0122126 | A1 | * | 9/2002 | Lenz | .............................. | 348/297 |
| 2006/0279650 | A1 | * | 12/2006 | Watanabe et al. | ............. | 348/308 |
| 2008/0062295 | A1 | * | 3/2008 | Fujimura et al. | .............. | 348/301 |

FOREIGN PATENT DOCUMENTS

JP     2000-287131 A    10/2000

\* cited by examiner

*Primary Examiner* — Joel Fosselman
(74) *Attorney, Agent, or Firm* — Westerman, Hattori, Daniels & Adrian, LLP

(57) ABSTRACT

A solid-state imaging apparatus having a pixel section where pixel cells are two-dimensionally arranged with each having a photoelectric conversion section for generating signal electric charges corresponding to an object image, an amplification section for outputting a signal corresponding to an amount of the signal electric charges retained at a memory section, and a vertical signal lines for reading output of the signal from the amplification section; the vertical signal lines having a second amplification section having an amplifier reset circuit where the amplifier reset circuit connected between an output terminal and an inverting input terminal of the column amplifier and a feedback capacitor connected between the inverting input terminal and the output terminal of the column amplifier where the amplifier reset circuit allows the output terminal and the inverting input terminal of the column amplifier to short, and the switch is on-state when the column amplifier resets.

7 Claims, 12 Drawing Sheets

SOLID-STATE IMAGING APPARATUS FOR SUPPRESSING NOISE

This application claims benefit of Japanese Patent Application No. 2007-246725 filed in Japan on Sep. 25, 2007, the contents of which are incorporated by this reference.

BACKGROUND OF THE INVENTION

The present invention relates to solid-state imaging apparatus, and more particularly relates to MOS solid-state imaging apparatus capable both of using a concurrent shutter operation mode and of suppressing a noise and a darkening.

In recent years, MOS (Metal Oxide Semiconductor) type image sensors are drawing attention. An occurrence of phenomenon concerning such MOS image sensors has become evident that, when a very large amount of light enters, such a portion (portion receiving large amount of light) is caused to look black as if there has been no incidence of light at all. This phenomenon is hereinafter referred to as "black sun phenomenon". Methods have been proposed to suppress the black sun phenomenon.

FIG. 1 is a schematic circuit diagram showing an example of construction of prior-art MOS solid-state imaging apparatus as disclosed in Japanese Patent Application Laid-Open 2000-287131. The solid-state imaging apparatus according to this example has a pixel section where a plurality of unit pixels (pixel cells) are two-dimensionally arranged, each including: a photodiode PD1 for effecting photoelectric conversion; a memory FD for temporarily retaining photoelectric conversion signal electric charges that occur in a predetermined period at photodiode PD1; a transfer transistor M4 for transferring photoelectric conversion signal electric charges from photodiode PD1 to the memory FD; a reset transistor M2 connected at one end to a power supply VDD, for resetting memory FD and photodiode PD1; an amplification transistor M1 for amplifying and reading the voltage level of memory FD; and a row select transistor M3 for reading output of the amplification transistor M1 selectively out to vertical signal lines 3-1, 3-2. In the illustrated example, a portion consisting of 2×2 arrangement of 4 pixels P11 to P22 is shown as the pixel section.

The apparatus also includes: a vertical scanning section 2 from which reset control pulses φRST1, φRST2, transfer control pulses φTX1-1, φTX1-2, row select pulses φROW1, φROW2 are outputted to drive the unit pixels P11 to P22; biasing transistors M6 for flowing a constant current to the vertical signal lines 3-1, 3-2; and a bias current regulating voltage line VBIAS for determining the current value of the biasing transistors M6. It further includes a clipping circuit 10 consisting of: a clipping transistor M10 for clipping the vertical signal lines 3-1, 3-2 at a constant voltage; a clip voltage VREF; and a clipping circuit select transistor M11 for connecting the clipping transistor M10 to the vertical signal lines 3-1, 3-2 by means of a clip control pulse φCLIP. Also included is a noise suppressing section 11 consisting of: a clamp capacitor C1 connected to the vertical signal lines 3-1, 3-2; a hold capacitor C2 for retaining amount of change of voltage of the vertical signal lines 3-1, 3-2; a sample-and-hold transistor M15 for connecting between the clamp capacitor C1 and the hold capacitor C2 by means of a sample-and-hold pulse φSH; and a clamp transistor M14 for clamping the clamp capacitor C1 and hold capacitor C2 to a noise suppressing section reference voltage VB by means of clamp pulse φCL.

It furthermore includes: a column select transistor M13 for reading signal from the hold capacitor C2 of each column to a horizontal signal line 15; a horizontal scanning section 20 for outputting horizontal select pulses φH1, φH2 which are to drive the column select transistor M13; a horizontal signal line reset transistor M20 for resetting the horizontal signal line 15 to a horizontal signal line reset voltage VHR by means of a horizontal signal line reset pulse φHR; an output amplifier 16 for amplifying and reading potential of the horizontal signal line 15; and AD converter 30 provided within the same chip as or at the outside of the solid-state imaging apparatus, for converting analog signal from the output amplifier 16 into digital signal. It should be noted that the vertical scanning section 2 and horizontal scanning section 20 are controlled by control signal from a control section 70 and that various types of control pulses are sent out from the control section 70.

FIG. 2 is a timing chart for explaining operation of the prior-art solid-state imaging apparatus shown in FIG. 1. A description will be given below with noticing the signal read operation from pixel P11 located at the first column on the first row. The reset control pulse φRST1 of the first row is driven to H level to turn ON the reset transistor M2 of the first row so as to reset a detection signal of the memory FD. Also at the same time, the row select pulse φROW1 of the first row is driven to H level to turn ON the row select transistor M3 of the first row so as to cause a reset voltage Vrst of the unit pixel P11 to be outputted to the vertical signal line 3-1. Outputted onto the vertical signal line 3-1 then is voltage (Vrst−Vgs-M1), i.e. lowered from the reset voltage Vrst by a threshold voltage Vgs-M1 of the amplification transistor M1.

At this time, the clamp control pulse φCL and sample-and-hold pulses SH are driven to H level to turn ON the sample-and-hold transistor M15 and clamp transistor M14. The clamp capacitor C1 and the hold capacitor C2 are thereby fixed to the clamp reference voltage VB.

Next, after bringing the reset control pulse φRST1 to L level, the clamp control pulse φCL is brought to L level to turn OFF the clamp transistor M14. A voltage (Vrst−Vgs-M1−Vrn) containing reset noise Vrn (feed-through component and KTC noise of the reset transistor M2) of each pixel is thereby retained at the clamp capacitor C1, and the connecting line between the clamp capacitor C1 and the hold capacitor C2 is brought into floating state. Subsequently, the transfer control pulse φTX1-1 of the first row is driven to H level to turn ON the transfer transistor M4 of the first row. The photoelectric conversion signal electric charge accumulated at photodiode PD1 is thereby transferred to the memory FD, and the transfer control pulse φTX1-1 is brought to L level again. Since the potential of memory FD is changed by amount corresponding to the photoelectric conversion signal voltage Vsig, it attains (Vrst−Vrn−Vsig) so that an output voltage (Vrst−Vgs-M1−Vrn−Vsig) is outputted onto the vertical signal line 3-1.

At this time, since amount corresponding to change from the voltage retained at the clamp capacitor C1 is accumulated at the hold capacitor C2, voltage (VB−[C1/(C1+C2)]×Vsig) is accumulated at the hold capacitor C2.

A differential processing is thereby effected at the noise suppressing section 11 between the voltage after reset and the voltage after transfer of photoelectric conversion signal charge of the unit pixel P11. Extracted thereby is photoelectric conversion signal voltage Vsig where reset noise Vrn such as KTC noise and feed-through component due to the reset transistor M2 of each pixel, as well as threshold voltage Vgs-M1 of the amplification transistor M1 are removed.

Subsequently, the sample-and-hold control pulse φSH is to L level to turn OFF the sample-and-hold transistor M15. A photoelectric conversion signal component of photodiode PD1 with noise being removed is thereby retained at the hold capacitor C2. Finally, photoelectric conversion signal components retained at the hold capacitor C2 are sequentially read out onto the horizontal signal line 15 by means of horizontal select pulse φH1, φH2 outputted from the horizontal scanning section 20 and are extracted from the output amplifier 16. Further, a signal from the output amplifier 16 is converted into digital signal by the AD converter 30 which is located within the same chip or at the outside. Here the reading by the horizontal select pulse φH1, φH2 is to be effected after the reset processing of the horizontal signal line 15 by the horizontal signal line reset transistor M20.

When the reading of signals of the first row is complete, signals of the second row are similarly read out. If, however, an intense light such as reflection light of the sun enters the MOS image sensor as described above, the black sun phenomenon occurs so that such portion is caused to look black. Supposing for example that an intense light is incident on the pixel P21 at the first column on the second row, the output of the amplification transistor M1 after reset of memory FD normally becomes a constant voltage (Vrst−Vgs-M1−Vrn) in theory in the above described reset operation of the pixel P21. Due to the effect of electric charge leaking into memory FD as a result of the incidence of an intense light, however, a leaked-in component of electric charge Vleak occurs after bringing the reset control pulse φRST2 to L level. The voltage of the vertical signal line 3-1 is thereby attained as (Vrst−Vgs-M1−Vrn−Vleak). For this reason, the voltage clamped by the clamp capacitor C1 becomes lower than normal.

The voltage of memory FD, when lowered to a certain level, does not fall any further. For this reason, the voltage of the memory FD hardly changes when Vleak has become large, even when photoelectric conversion signal charge of PD1 of the pixel P21 is transferred to the memory FD by driving the transfer control pulse φTX1-2 of the second row to H level. There is thus hardly any change from the clamp voltage, and, as a result, the black sun phenomenon occurs when high-luminance light enters. To suppress such black sun phenomenon, a clipping circuit 10 is provided in the solid-state imaging apparatus shown in FIG. 1.

FIG. 3 is a timing chart for explaining operation when the clipping circuit 10 is activated to suppress the black sun phenomenon. It is supposed that an intense light has entered the pixel P21. At this time, when reset control pulse φRST2 is brought to L level, the electric charge leaked into memory FD is accumulated and at the same time drop in potential of memory FD by Vleak occurs so that potential of the vertical signal line 3-1 steadily falls. Here, when clip pulse φCLIP is maintained at H level, the clipping transistor M10 is turned ON if the potential of the vertical signal line 3-1 has fallen to a potential (VREF−Vgs-M10), i.e. threshold voltage Vgs-M10 of the clipping transistor M10 subtracted from the clip reference potential VREF. When the clipping transistor M10 is turned ON, an electric current is supplied from the clipping circuit 10 to the vertical signal line 3-1 so as to keep the potential of the vertical signal line 3-1. Accordingly, even when potential of the vertical signal line 3-1 has fallen, such potential is clipped to potential (VREF−Vgs-M10) by activating the clipping circuit 10. A sufficient difference voltage is then detected and the black sun phenomenon is suppressed by turning OFF the clamping transistor M14 so as to clamp the voltage (VREF−Vgs-M10) of the vertical signal line 3-1 at the clamp capacitor C1 and effecting differential processing with the voltage after transfer of photoelectric conversion signal.

SUMMARY OF THE INVENTION

In a first aspect of the invention, there is provided a solid-state imaging apparatus including: a pixel section where a plurality of pixel cells are two-dimensionally arranged with each having a photoelectric conversion section for generating signal electric charges corresponding to an object image, a memory means for temporarily retaining the signal electric charges, an electric charge transfer means for transferring the signal electric charges generated at the photoelectric conversion section to the memory means, an amplification means for outputting a signal corresponding to an amount of the signal electric charges retained at the memory means, and a reset means for resetting the memory means; a plurality of vertical signal lines for reading the output of signal from the amplification means along a vertical direction with treating individual one of the pixel cells arranged in a horizontal direction as unit; a horizontal signal line for reading signals from the plurality of vertical signal lines along the horizontal direction; an A/D converter for converting output from the horizontal signal line into digital signal; a frame memory for retaining output signal level of one or the other of a first output signal level of the pixel cell at the time of reset converted into the digital signal and a second output signal level of the pixel cell after transfer by the electric charge transfer means; a subtracter for computing a difference between the one output signal level retained at the frame memory and the other output signal level; a clip means for clipping the first output signal level to a predetermined clipping level when the first output signal level is changed more than a predetermined threshold only at the time of reading of the first output signal level; and a control section for executing a frame read mode where a control is effected so as to read the first output signal level and the second output signal level respectively at different timings with treating frame as unit.

In a second aspect of the invention, the control section in the solid-state imaging apparatus according to the first aspect causes simultaneous operation of the electric charge transfer means of all pixel cells.

In a third aspect of the invention, the clip means in the solid-state imaging apparatus according to the first or second aspect is connected to the vertical signal lines.

In a fourth aspect of the invention, the clip means in the solid-state imaging apparatus according to the first or second aspect is connected to the horizontal signal line.

In a fifth aspect of the invention, the clip means in the solid-state imaging apparatus according to the first or second aspect executes a clipping operation on an output from the A/D converter.

In a sixth aspect of the invention, the vertical signal line in the solid-state imaging apparatus according to any one of the first to fifth aspects has a second amplification means for amplifying the output signal level from the pixel cell.

In a seventh aspect of the invention, the control section in the solid-state imaging apparatus according to the sixth aspect has the frame read mode as a first read mode and in addition has a second read mode where a control is effected so as to read the first output signal level and the second output signal level respectively at different timings with treating pixel group arranged in single row in the horizontal direction as unit, wherein the second amplification means at the time of the second read mode amplifies and outputs the difference between the first output signal level and the second output signal level.

In an eighth aspect of the invention, the clip means in the solid-state imaging apparatus according to any one of the first to seventh aspects has the clipping level as capable of being changed.

DESCRIPTION OF THE PREFERRED EMBODIMENTS

Some embodiments of the solid-state imaging apparatus according to the invention will be described below with reference to the drawings.

(Embodiment 1)

Figure 1:
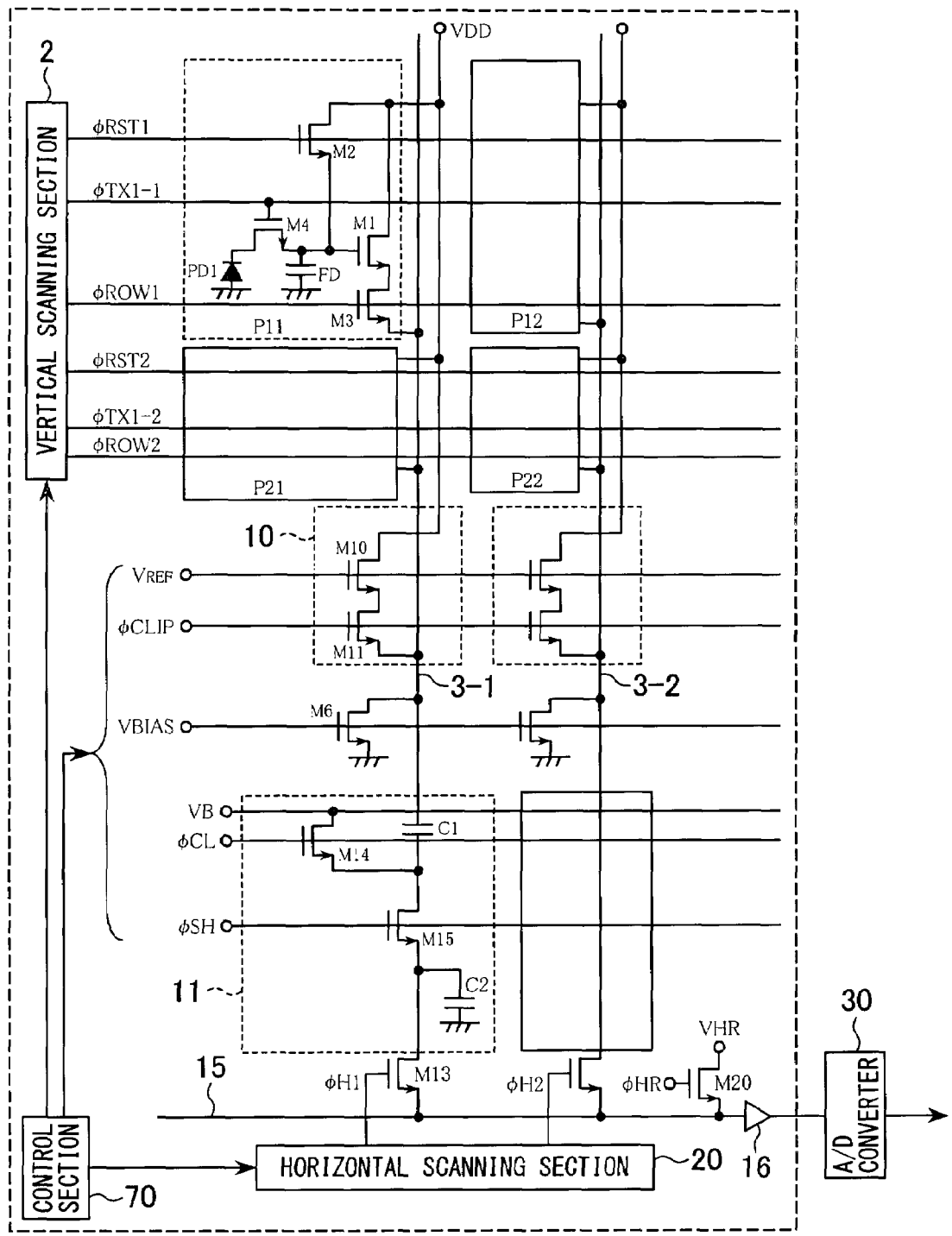
FIG. 1. is a schematic circuit diagram showing an example of construction of prior-art solid-state imaging apparatus.
Figure 2:
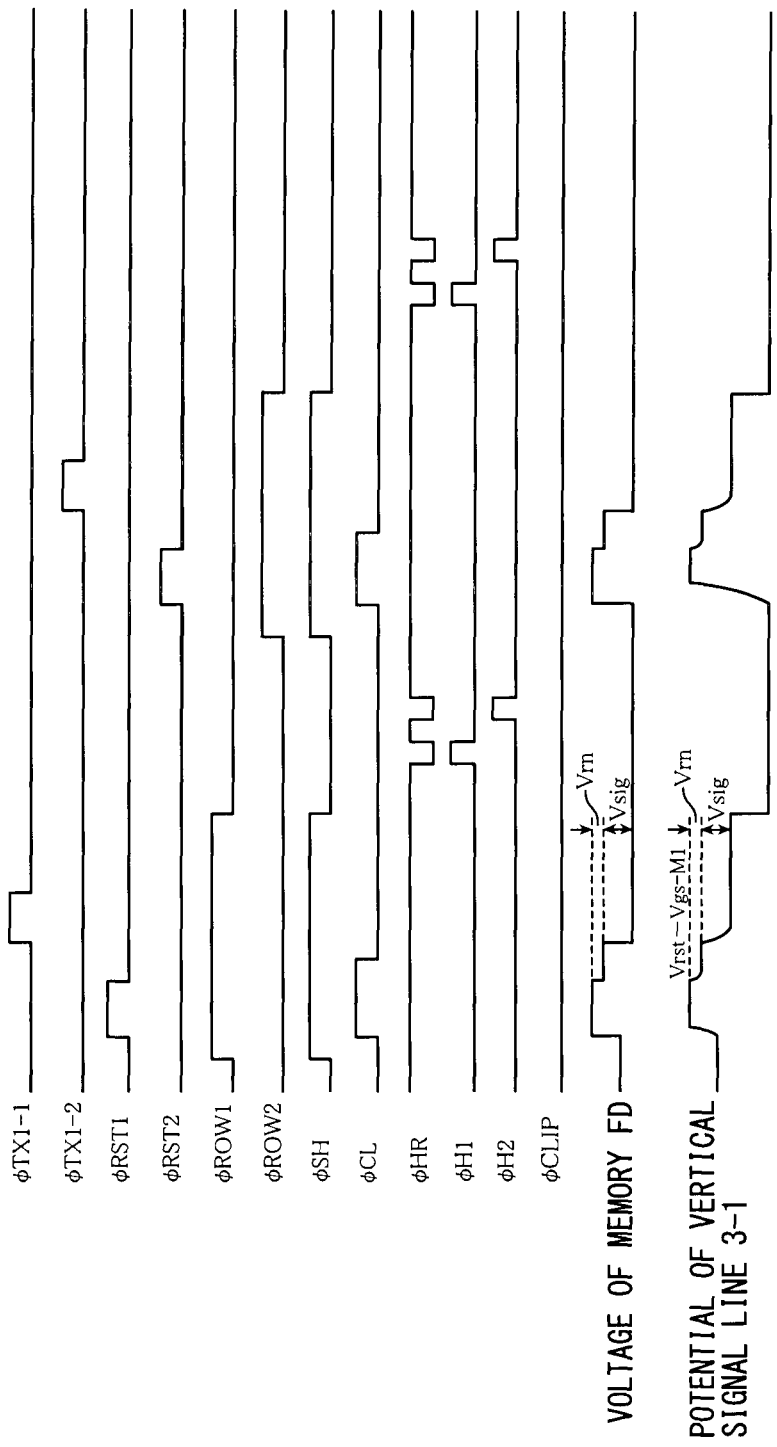
FIG. 2 is a timing chart for explaining operation of the prior-art example shown in FIG. 1.
Figure 3:
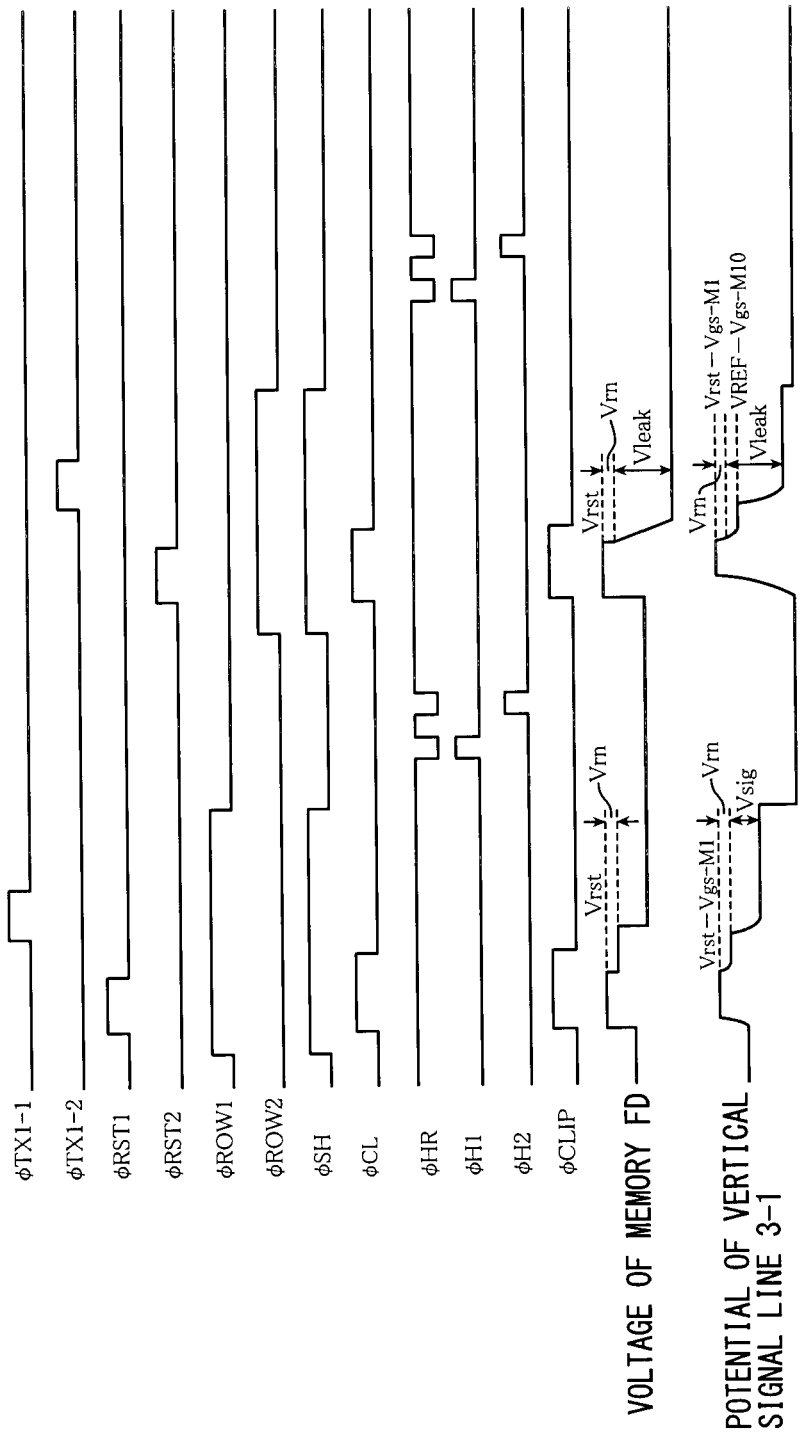
FIG. 3 is a timing chart for explaining operation in the case where the clipping circuit in the prior-art example shown in FIG. 1 is put into operation.
Figure 4:
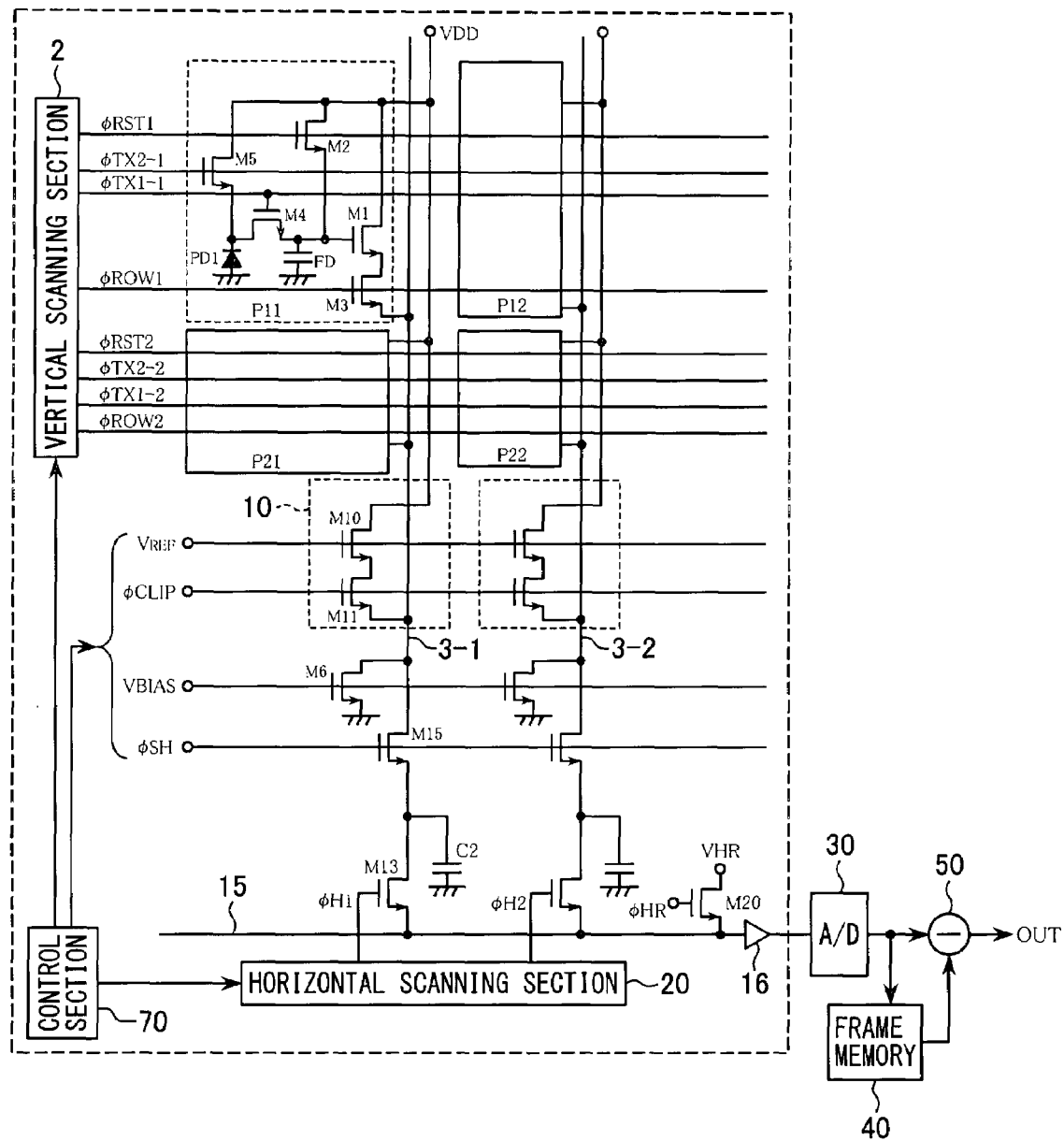
FIG. 4 is a schematic circuit diagram showing construction of a first embodiment of the solid-state imaging apparatus according to the invention.

FIG. 4 is a schematic circuit diagram showing construction of a first embodiment of the solid-state imaging apparatus according to the invention. The solid-state imaging apparatus according to this embodiment has a pixel section where a plurality of unit pixels (pixel cells) are two-dimensionally arranged, each including: a photodiode PD1 for effecting photoelectric conversion; a memory FD for temporarily retaining photoelectric conversion signal electric charges that occur in a predetermined period at photodiode PD1; a transfer transistor M4 for transferring photoelectric conversion signal electric charges from photodiode PD1 to the memory FD1; a discharge transistor M5 for resetting photodiode PD1; a reset transistor M2 for resetting memory FD; an amplification transistor M1 for amplifying and reading the voltage level of memory FD; and a row select transistor M3 for reading output of the amplification transistor M1 selectively out to vertical signal lines 3-1, 3-2. In the illustrated example, a portion consisting of 2×2 arrangement of 4 pixels P11 to P22 is shown as the pixel section.

The apparatus also includes: a vertical scanning section 2 from which reset control pulses φRST1, φRST2, transfer control pulses φTX1-1, φTX1-2, discharge control pulses φTX2-1, φTX2-2, row select pulses φROW1, φROW2 are outputted to drive the unit pixels P11 to P22; biasing transistors M6 for flowing a constant current to the vertical signal lines 3-1, 3-2; and a bias current regulating voltage line VBIAS for determining the current value of the biasing transistors M6. It further includes a clipping circuit 10 consisting of: a clipping transistor M10 for clipping the vertical signal lines 3-1, 3-2 at a constant voltage; a clip voltage VREF; and a clipping circuit select transistor M11 for connecting the clipping transistor M10 to the vertical signal lines 3-1, 3-2 by means of a clip control pulse φCLIP.

Also included are: hold capacitors C2 for retaining voltage level of the vertical signal lines 3-1, 3-2; sample-and-hold transistors M15 for connecting the hold capacitor C2 to the vertical signal line 3-1, 3-2 by means of sample-and-hold pulse φSH; column select transistors M13 for reading signal from the hold capacitor C2 of each column to a horizontal signal line 15; a horizontal scanning section 20 for outputting horizontal select pulses φH1, φH2 which are to drive the column select transistors M13; a horizontal signal line reset transistor M20 for resetting the horizontal signal line 15 to a horizontal signal line reset voltage VHR by means of a horizontal signal line reset pulse φHR; an output amplifier 16 for amplifying and reading potential of the horizontal signal line 15; AD converter 30 located within the same chip as or at the outside of the solid-state imaging apparatus, for converting analog signal from the output amplifier 16 into digital signal; a frame memory 40 capable of retaining digital signal outputted from the AD converter by the number of unit pixels; and a subtracter 50 for differentiating between the output of AD converter 30 and the signal of the frame memory 40. It should be noted that the vertical scanning section 2 and horizontal scanning section 20 are controlled by control signal from a control section 70 and that various types of control pulses are sent out from the control section 70.

Figure 5:
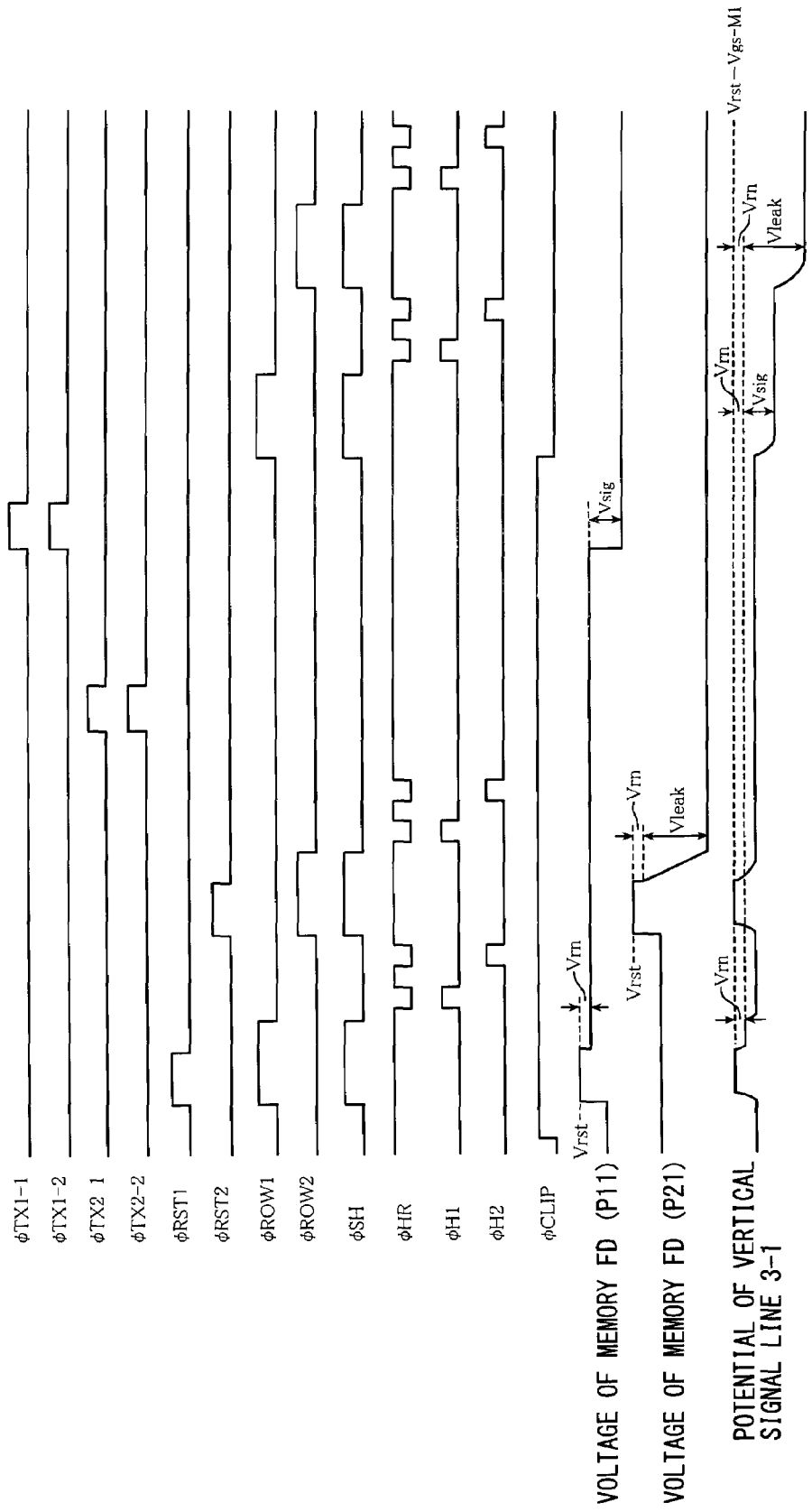
FIG. 5 is a timing chart for explaining operation of the first embodiment shown in FIG. 4.

FIG. 5 is a timing chart for explaining operation of the solid-state imaging apparatus according to the first embodiment shown in FIG. 4. A description will be given below with noticing a signal read operation from pixel P11 located at the first column on the first row. The reset control pulse φRST1 of the first row is driven to H level to turn ON the reset transistor M2 of the first row so as to reset detection signal of the memory FD. At the same time, the row select pulse φROW1 of the first row is driven to H level to turn ON the row select transistor M3 of the first row so as to cause reset voltage Vrst of the unit pixel P11 to be outputted to the vertical signal line 3-1. Outputted onto the vertical signal line 3-1 then is voltage (Vrst−Vgs-M1), i.e. lowered from the reset voltage Vrst by threshold voltage Vgs-M1 of the amplification transistor M1. Also, the sample-and-hold pulse φSH is driven to H level so as to accumulate voltage level of the vertical signal line 3-1 at the hold capacitor C2.

Next, when the reset control pulse φRST1 of the first row is brought to L level, potential of memory FD is to contain reset noise Vrn (feed-through component and KTC noise of the reset transistor M2) of the reset transistor M2 of each pixel of the first row and attains (Vrst−Vrn). Further, voltage (Vrst−Vgs-M1−Vrn), i.e. lowered by threshold voltage Vgs-M1 of the amplification transistor M1 is outputted onto the vertical signal line 3-1. Here, the sample-and-hold pulse φSH is brought to L level to retain voltage level of the vertical signal line 3-1 at the hold capacitor C2.

Next, horizontal select pulses φH1, φH2 are inputted by controlling the horizontal scanning section 20 so that potentials retained at the hold capacitors C2 are sequentially read out onto the horizontal signal line 15. When the reading onto the horizontal signal line 15 of the reset voltage of the first row is complete, reset voltage of the second row is then similarly read out.

After amplified at the output amplifier 16 and converted into digital signal at AD converter 30, digital value of the potential on the horizontal signal line 15 α(Vrst−Vgs-M1−Vrn) obtained by multiplication of amplification factor α up to the output amplifier 16 is retained respectively as reset voltage of each pixel at the frame memory 40. In this manner, reset voltages corresponding to all pixels are at first retained at the frame memory 40.

For the photodiode PD1, discharge control pulses φTX2-1 and φTX2-2 of the first row and second row are driven to H level to turn ON the discharge transistor M5 simultaneously of all pixels so that electric charges of photodiode PD1 of all pixels are concurrently reset. After passage of a predetermined exposure time, the transfer control pulses φTX1-1 and φTX1-2 of the first row and second row are driven to H level so that the transfer transistor M3 of all pixels is simultaneously turned ON. The photoelectric conversion signal electric charge generated after reset at the photodiode PD1 is thereby transferred to memory FD simultaneously of all pixels. The potential of memory FD attains (Vrst−Vrn−Vsig), since it is changed by amount corresponding to the photoelectric conversion signal voltage Vsig.

Subsequently, the row select transistor M3 of the first row is turned ON by driving row select pulse φROW1 of the first row to H level so that the voltage after signal transfer of the unit pixel P11 is outputted onto the vertical signal line 3-1. The voltage (Vrst−Vgs-M1−Vrn−Vsig), i.e. lowered by threshold voltage Vgs-M1 of the amplification transistor M1 is thereby outputted onto the vertical signal line 3-1. Further, by driving the sample-and-hold pulse φSH to H level to previously accumulate voltage level of the vertical signal line 3-1 at the hold capacitor C2 and then bringing the sample-and-hold pulse φSH to L level, the voltage level of the vertical signal line 3-1 is retained at the hold capacitor C2.

Next, horizontal select pulses φH1, φH2 are inputted so that potentials retained at the hold capacitors C2 are sequentially read out onto the horizontal signal line 15. When the reading onto the horizontal signal line 15 of the voltage after signal transfer of the first row is complete, the voltage after signal transfer of the second row is then similarly read out.

The potential of the horizontal signal line 15 is amplified at the output amplifier 16 and converted into digital signal at AD converter 30, and its digital value of α(Vrst−Vgs-M1−Vrn−Vsig) obtained by multiplication of amplification factor α up to the output amplifier 16 is outputted. At the subtracter 50, then, it is subtracted from the digital value of the reset voltage α(Vrst−Vgs-M1−Vrn) of the same pixel retained at the frame memory 40. The signal component Vsig in digital value is thereby extracted with removing the reset noise Vrn due to reset transistor M2 of each pixel and the threshold voltage Vgs-M1 of amplification transistor M1.

It is thereby possible to read signal where noise components are suppressed. Further, since discharge transistor M5 and transfer transistor M3 of all pixels are respectively simultaneously controlled, it is possible to obtain photoelectric conversion signal of the same accumulation period for all pixels. In addition, the clipping circuit 10 is used to suppress the black sun phenomenon where, when an intense light such as reflection light of the sun enters the pixel section of the construction as described above, such portion looks black. In particular, it is supposed that an intense light has entered the pixel P21 at the first column on the second row. As shown in FIG. 5, when reset control pulse RST2 of the second row is brought to L level at the time of incidence of such high-luminance light, the electric charges leaked into memory FD of the pixel 21 are accumulated. The potential of memory FD of the pixel 21 is thereby lowered by Vleak, and potential of the vertical signal line 3-1 steadily falls.

Here, by maintaining the clip control pulse φCLIP at H level, the clipping transistor M10 is turned ON if potential of the vertical signal line 3-1, 3-2 has fallen to (VREF−Vgs-M10), i.e. the threshold voltage Vgs-M10 of clipping transistor subtracted from the clipping reference potential VREF. When the clipping transistor M10 is turned ON, an electric current is supplied from the clipping circuit 10 to the vertical signal line 3-1 so that potential of the vertical signal line 3-1 is kept. Even when potential of the vertical signal line 3-1 is lowered, it is thus clipped at potential (VREF−Vgs-M10) by activating the clipping circuit 10. Therefore, even if voltage of memory FD after reset voltage falls at the time of incidence of high-luminance light, the reset voltage retained at the frame memory 40 is clipped at α(VREF−Vgs-M10).

A sufficient difference voltage is thereby detected even when differential processing between the reset voltage retained at the frame memory 40 and the voltage after signal transfer is performed at the subtracter 50 so that the black sun phenomenon is suppressed. Further, the clip control pulse φCLIP can be continuously kept at H level in the period from start to end of the reading of reset signal of all pixels so that the black sun phenomenon can be suppressed by means of simple control.

According to the first embodiment as the above, it is possible with using a simple control to obtain the signal output having less noise while suppressing the black sun phenomenon. Further, photoelectric conversion signal of the same accumulation period can be obtained of all pixels so that it becomes possible to obtain signal output where distortion in moving image is suppressed.

(Embodiment 2)

Figure 6:
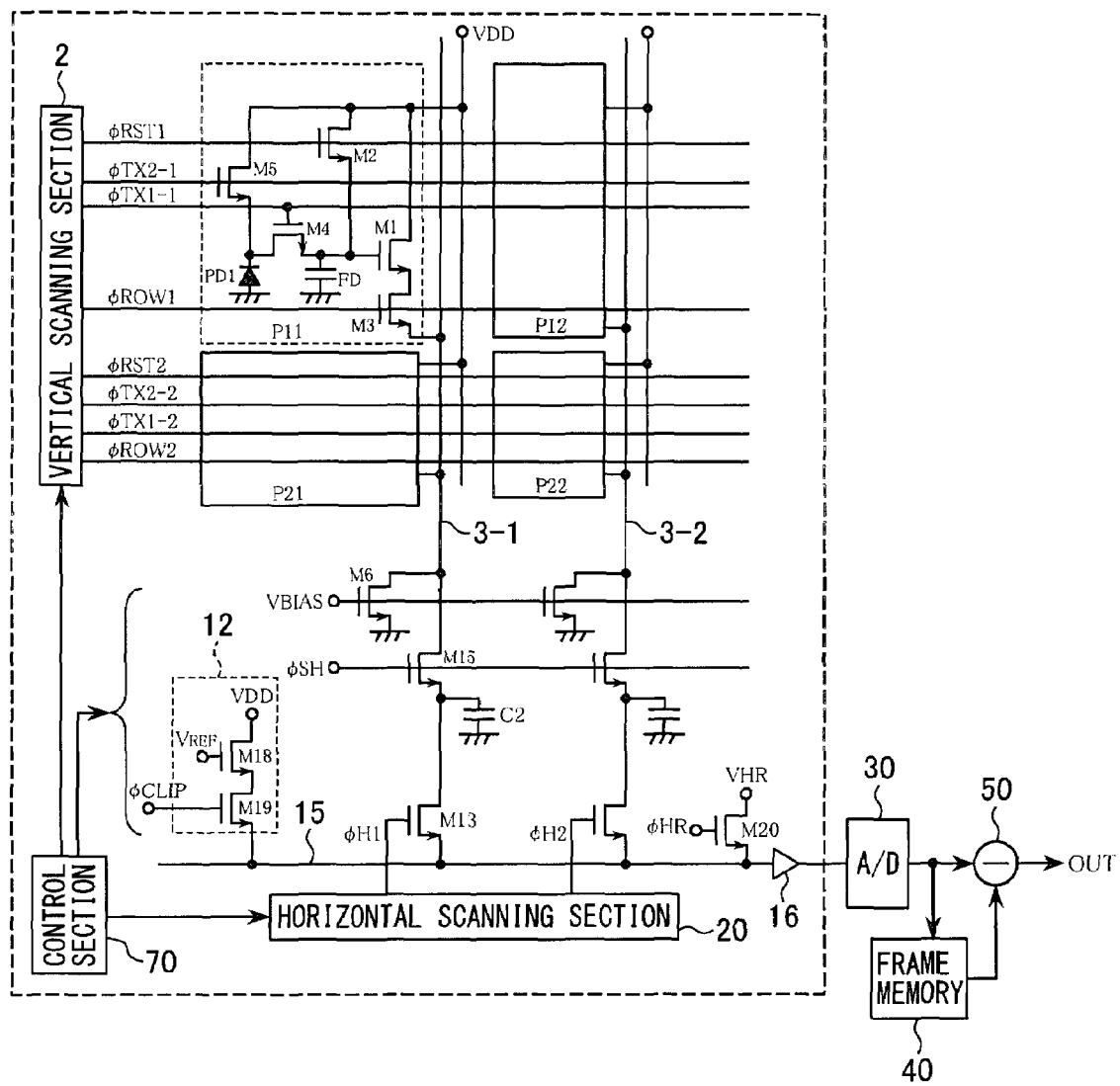
FIG. 6 is a schematic circuit diagram showing construction of the solid-state imaging apparatus according to a second embodiment.

A second embodiment will now be described. FIG. 6 is a schematic circuit diagram showing construction of the solid-state imaging apparatus according to the second embodiment. The construction of the second embodiment but a clipping circuit 12 is the same as the first embodiment shown in FIG. 4. The clipping circuit 12 according to the second embodiment includes: a clipping transistor M18 for causing the horizontal signal line 15 to be clipped at a constant voltage; a clip voltage VREF; and a clipping circuit select transistor M19 for connecting the clipping transistor M18 to the horizontal signal line 15 by means of clip control pulse φCLIP.

Figure 7:
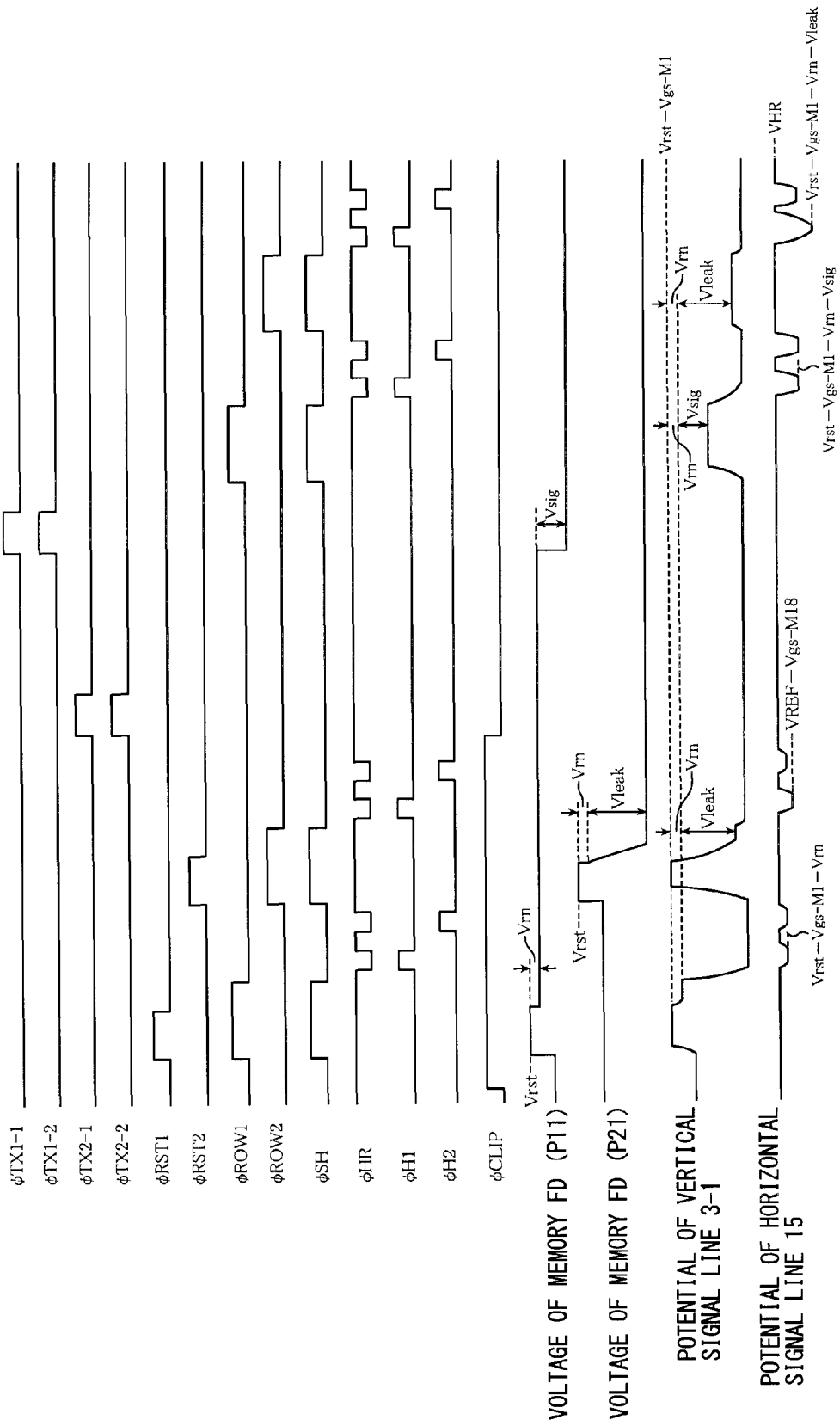
FIG. 7 is a timing chart for explaining operation of the second embodiment shown in FIG. 6.

FIG. 7 is a timing chart for explaining operation of the solid-state imaging apparatus according to the second embodiment shown in FIG. 6. Since its operation except the clipping circuit 12 is similar to the first embodiment, only the operation of the clipping circuit 12 in the second embodiment will be described below. It is supposed that an intense light has entered the pixel P21 at the first column on the second row. When reset control pulse φRST2 is brought to L level, the potential of memory FD of the pixel 21 falls by Vleak from the voltage after reset (Vrst−Vrn) due to electric charge leaked into the memory FD and attains (Vrst−Vrn−Vleak). The potential of the vertical signal line 3-1 thereby also attains (Vrst−Vgs-M1−Vrn−Vleak), i.e. lowered by amplification transistor Vgs-M1 from the potential of memory FD of the pixel P21.

Here, by maintaining the clip control pulse φCLIP at H level, the clipping transistor M18 is turned ON if the potential of the horizontal signal line 15 has fallen to (VREF−Vgs-M18), i.e. threshold voltage Vgs-M18 of the clipping transistor subtracted from the clip voltage VREF when potential of the vertical signal line 3-1 retained at the hold capacitor C2 is read out onto the horizontal signal line 15 by driving the horizontal select pulses φH1, H2 to H level. When the clipping transistor M18 is turned ON, an electric current is supplied from the clipping circuit 12 to the horizontal signal line 15 so that potential of the horizontal signal line 15 is kept. Even when potential of the horizontal signal line 15 is lowered, it is thus clipped at potential (VREF−Vgs-M18) by activating the clipping circuit 12. Even if voltage of memory FD after reset voltage falls at the time of incidence of high-luminance light, the reset voltage retained at the frame memory 40 is thereby clipped at α(VREF−Vgs-M18).

A sufficient difference voltage is thus detected even when differential processing between the reset voltage retained at the frame memory 40 and the voltage after signal transfer is performed at the subtracter 50, thereby suppressing the black sun phenomenon. Further, it is possible to suppress the black sun phenomenon with a simple control by maintaining the clip control pulse φCLIP at H level in the period from start to end of the reading of reset signal of all pixels. It is furthermore possible to greatly reduce the number of clipping circuits as compared to the first embodiment.

According to the second embodiment as the above, it is possible with using a simple construction and control to obtain signal output having less noise while suppressing the black sun phenomenon. Further, since the discharge transistor M5 and the transfer transistor M3 each of all pixels are simultaneously controlled, photoelectric conversion signal of the same accumulation period can be obtained of all pixels. It is thereby possible to obtain signal output where distortion in moving image is suppressed.

(Embodiment 3)

Figure 8:
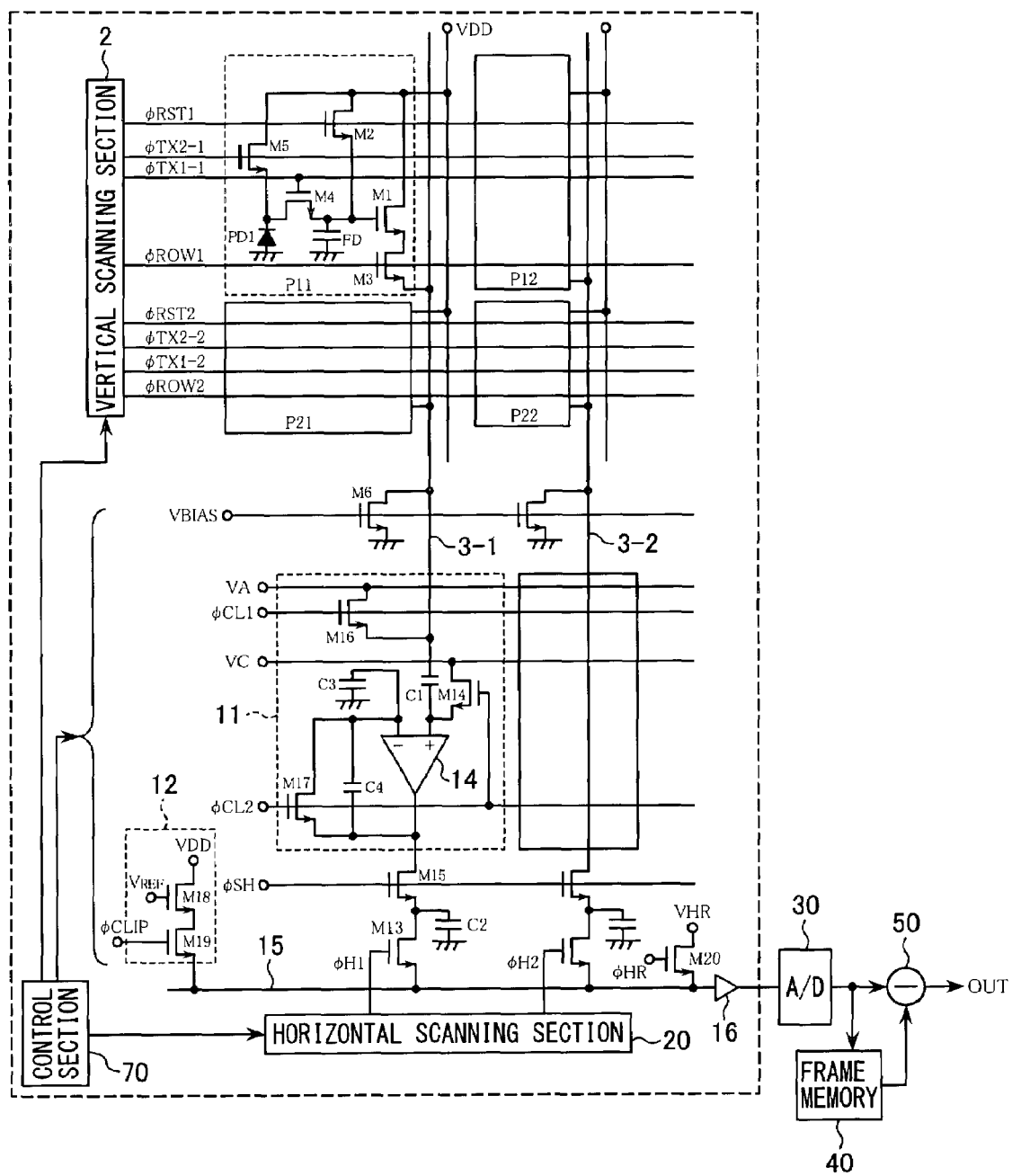
FIG. 8 is a schematic circuit diagram showing construction of the solid-state imaging apparatus according to a third embodiment.

A third embodiment will now be described. FIG. 8 is a schematic circuit diagram showing construction of the solid-state imaging apparatus according to the third embodiment. A column signal amplification section 11 is added to the solid-state imaging apparatus according to the second embodiment shown in FIG. 6, and the rest of its construction is similar to the second embodiment shown in FIG. 6. The column signal amplification section 11 includes: an amplification reference voltage VA serving as reference voltage of amplification; an amplification reference voltage clamp transistor M16 for supplying the amplification reference voltage VA to the vertical signal lines 3-1, 3-2 by means of an amplification reference voltage clamp pulse φCL1; a clamp capacitor C1 connected at one end to the vertical signal line 3-1, 3-2 and at the other end to non-inverting input terminal of a column amplifier 14; a clamp transistor M14 for fixing the non-inverting input terminal of the column amplifier 14 to a column amplifier reference voltage VC; an amplification capacitor C3 connected to an inverting input terminal of the column amplifier 14; a feedback capacitor C4 connected between the inverting input terminal and an output terminal of the column amplifier 14; and an amplifier reset transistor M17 connected between the output terminal and the inverting input terminal of the column amplifier 14 for resetting the column amplifier 14. The clamp transistor M14 and the amplifier reset transistor M17 are to be controlled by a column amplifier reset pulse φCL2.

Figure 9:
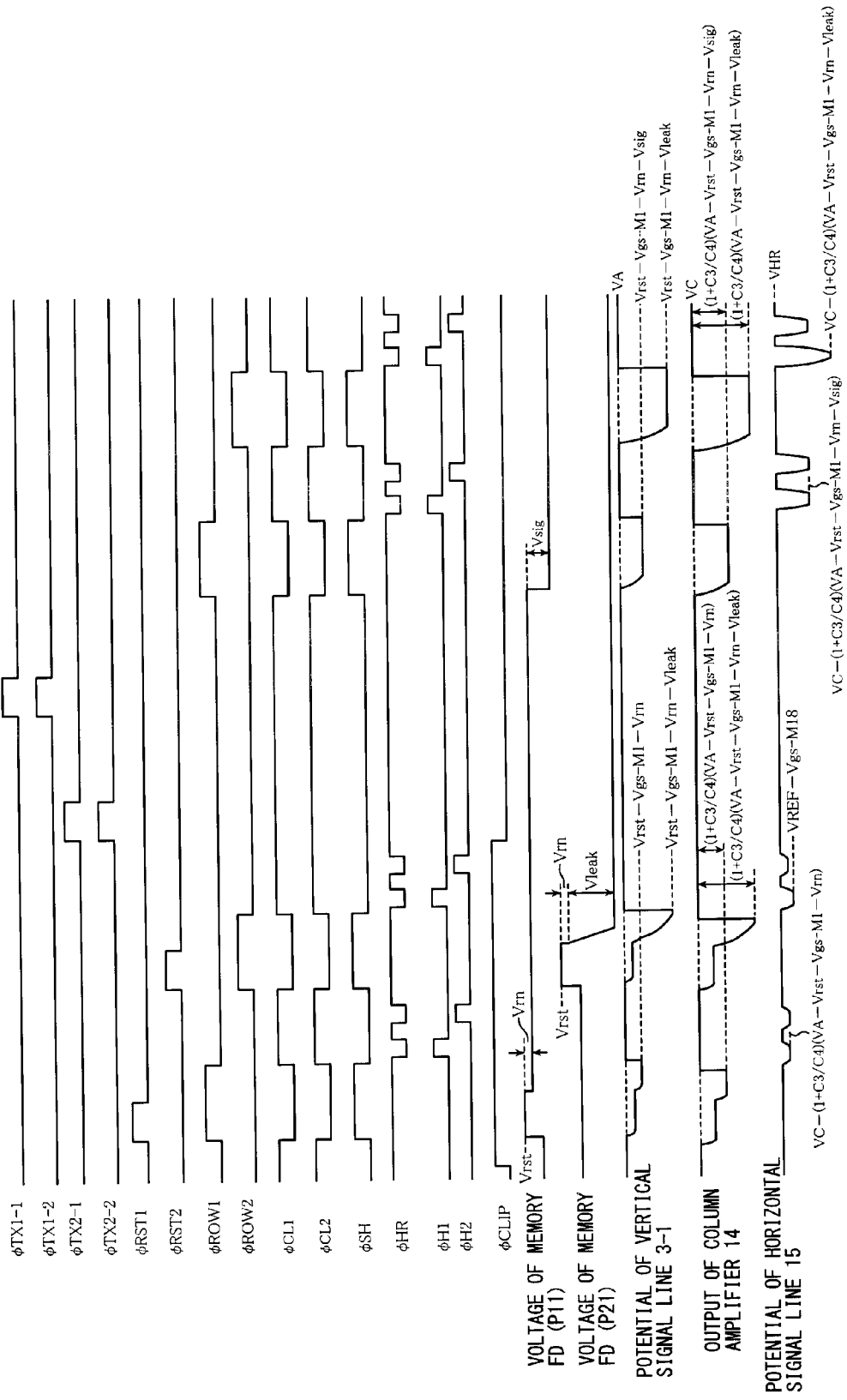
FIG. 9 is a timing chart for explaining operation of the third embodiment shown in FIG. 8.

FIG. 9 is a timing chart for explaining operation of the solid-state imaging apparatus according to the third embodiment shown in FIG. 8. A description will be given below with noticing signal read operation from the pixel P11 at the first column on the first row. The amplification reference voltage clamp pulse φCL1 and the column amplifier reset pulse φCL2 are driven to H level to fix potential of the vertical signal lines 3-1, 3-2 at the amplification reference voltage VA and at the same time to bring the column amplifier 14 into reset condition. Next, the amplification reference voltage clamp pulse φCL1 and the column amplifier reset pulse φCL2 are brought to L level to retain the amplification reference voltage VA at the clamp capacitor C1. Subsequently, the reset transistor M2 of the first row is turned ON by driving the reset control pulse φRST1 of the first row to H level so as to reset the detection signal of memory FD, and at the same time the row select transistor M3 of the first row is turned ON by driving the row select pulse φROW1 of the first row to H level. The reset voltage Vrst of the unit pixel P11 is thereby outputted to the vertical signal line 3-1. Further, the sample-and-hold pulse φSH is driven to H level to accumulate output of the column amplifier 14 at the hold capacitor C2.

Next, when the reset control pulse φRST1 of the first row is brought to L level, the potential of memory FD is to contain reset noise Vrn of reset transistor M2 (feed-through component and KTC noise of reset transistor M2) of each pixel of the first row and attains (Vrst−Vrn). Further, a voltage (Vrst−Vgs-M1−Vrn), i.e. lowered by threshold voltage Vgs-M1 of the amplification transistor M1 is outputted onto the vertical signal line 3-1. At this time, the output of the column amplifier 14 attains VC−(1+C3/C4)×[VA−(Vrst−Vgs-M1−Vrn)], i.e. the reset signal multiplied by (1×C3/C4). Here, the sample-and-hold pulse φSH is brought to L level to retain the output potential of the column amplifier 14 at the hold capacitor C2.

Next, horizontal select pulses φH1, φH2 are sequentially inputted by controlling the horizontal scanning section 20 so that output voltages of the column amplifier 14 retained at the hold capacitors C2 are sequentially read out onto the horizontal signal line 15. When the reading onto the horizontal signal line 15 of the reset voltage of the first row is complete, reset voltage of the second row is then similarly read out. After amplified at the output amplifier 16 and converted into digital signal at AD converter 30, the potential on the horizontal signal line 15 α[VC−(1+C3/C4)×{VA−(Vrst−Vgs-M1−Vrn)}], i.e. obtained by multiplication of amplification factor α up to the output amplifier 16 is retained respectively as reset voltage of each unit pixel P11 to P22 at the frame memory 40. In this manner, reset voltages corresponding to all pixels are at first retained at the frame memory 40.

For the photodiode PD1, discharge control pulses φTX2-1 and φTX2-2 of the first row and second row are driven to H level to turn ON the discharge transistor M5 simultaneously of all pixels so that electric charges of photodiode PD1 of all pixels are concurrently reset. After passage of a predetermined exposure time, the transfer control pulses TX1-1 and TX1-2 of the first row and second row are driven to H level so that the transfer transistor M3 is turned ON. The photoelectric conversion signal electric charge generated after reset at the photodiode PD1 is thereby transferred to memory FD simultaneously of all pixels. The potential of memory FD attains (Vrst−Vrn−Vsig), since the photoelectric conversion signal component Vsig is added to the reset potential.

When it is read out in a similar manner as the reset signal, α[VC−(1+C3/C4)×{VA−(Vrst−Vgs-M1−Vrn)}] is outputted. It is then differentiated at the subtracter 50 from the reset voltage α[VC−(1+C3/C4)×{VA−(Vrst−Vgs-M1−Vrn)}] of the same pixel retained at the frame memory 40. The photoelectric conversion signal component Vsig is thereby extracted with reset noise Vrn due to reset transistor M2 and threshold voltage Vgs-M1 of the amplification transistor M1 being removed.

It is thereby possible to obtain photoelectric conversion signal of the same accumulation period for all pixels, and further to read signal where noise components are suppressed. Since column amplifier is used to amplify reset voltage and signal voltage, noise components that are added in the circuit system until the outputting can also be suppressed.

Further, when high-luminance light enters, the clip control pulse φCLIP is maintained at H level during the period of reading reset signal. The clipping transistor M18 is thereby turned ON when the potential of the horizontal signal line 15 has fallen to (VREF−Vgs-M18), i.e. threshold voltage Vgs-M18 of the clipping transistor M18 subtracted from the clip reference voltage VREF when the output voltage of column amplifier 14 retained at the hold capacitor C2 is read out onto the horizontal signal line 15 by driving the horizontal select pulses φH1, H2 to H level. When the clipping transistor M18 is turned ON, an electric current is supplied from the clipping circuit 12 to the horizontal signal line 15 so that potential of the horizontal signal line 15 is kept. Even when potential of the horizontal signal line 15 is lowered, it is thus clipped at potential (VREF−Vgs-M18) by activating the clipping circuit 12. Therefore, even if the voltage of memory FD after reset voltage falls at the time of incidence of high-luminance light, the reset voltage retained at the frame memory 40 is clipped at α(VREF−Vgs-M18). A sufficient difference voltage is thereby detected and the black sun phenomenon is suppressed even when it is differentiated from the voltage after signal transfer at the subtracter 50.

(Embodiment 4)

Figure 10:
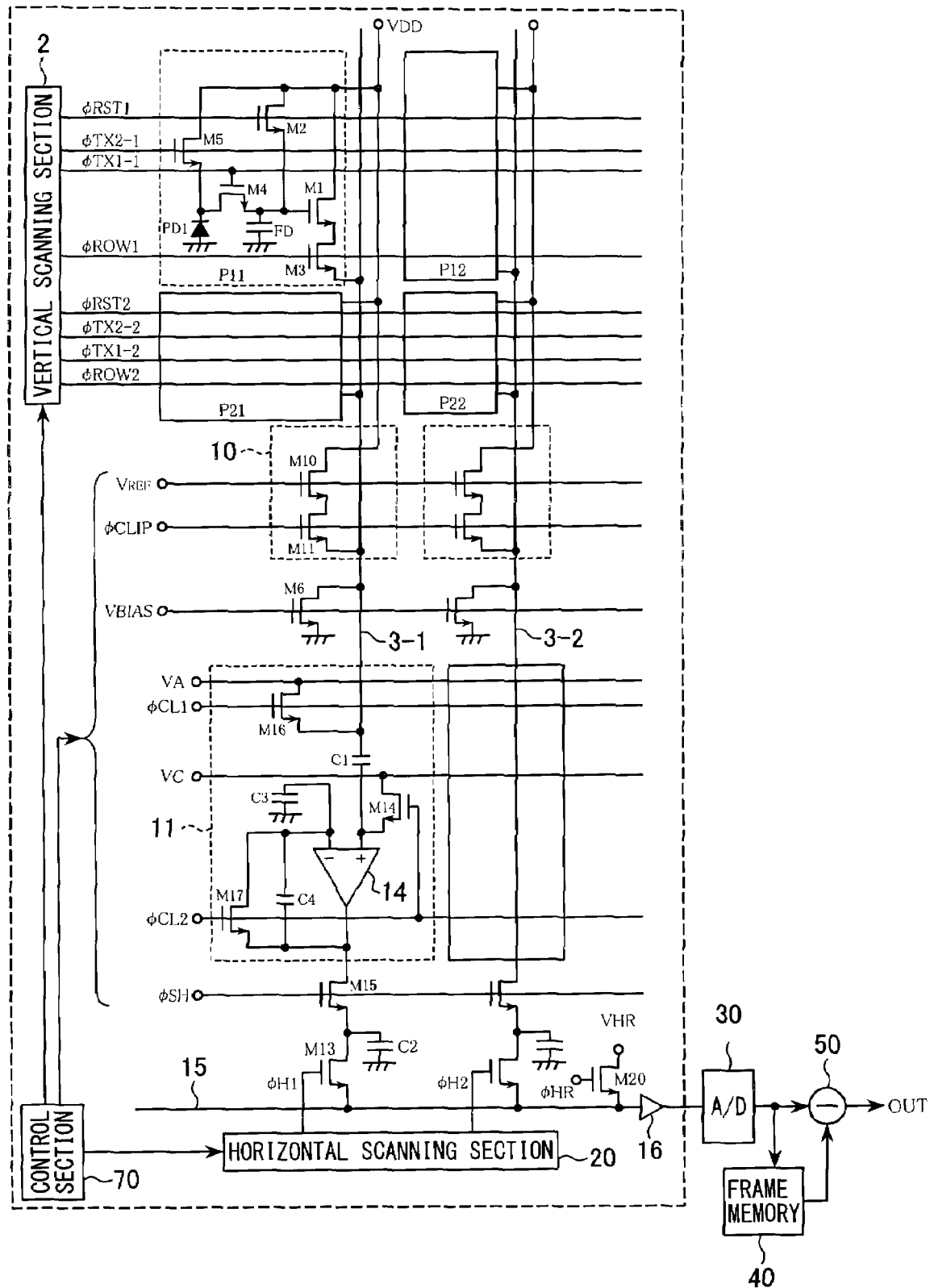
FIG. 10 is a schematic circuit diagram showing construction of the solid-state imaging apparatus according to a fourth embodiment.

A fourth embodiment will now be described. FIG. 10 is a schematic circuit diagram showing construction of the solid-state imaging apparatus according to the fourth embodiment. This embodiment is obtained by adding a column signal amplification section 11 to the first embodiment shown in FIG. 4, and the rest of its construction is similar to the first embodiment shown in FIG. 4. The column signal amplification section 11 includes: an amplification reference voltage VA serving as reference voltage of amplification; an amplification reference voltage clamp transistor M16 for supplying the amplification reference voltage VA to the vertical signal lines 3-1, 3-2 by means of an amplification reference voltage clamp pulse φCL1; a clamp capacitor C1 connected at one end to the vertical signal line 3-1, 3-2 and at the other end to non-inverting input terminal of a column amplifier 14; a clamp transistor M14 for fixing the non-inverting input terminal of the column amplifier 14 to a column amplifier reference voltage VC; a capacitor for amplification C3 connected to an inverting input terminal of the column amplifier 14; a feedback capacitor C4 connected between the inverting input terminal and a output terminal of the column amplifier 14; and an amplifier reset transistor M17 connected between the output terminal and the inverting input terminal of the column amplifier 14 for resetting the column amplifier 14. The clamp transistor M14 and the amplifier reset transistor M17 are to be controlled by a column amplifier reset pulse φCL2.

Figure 11:
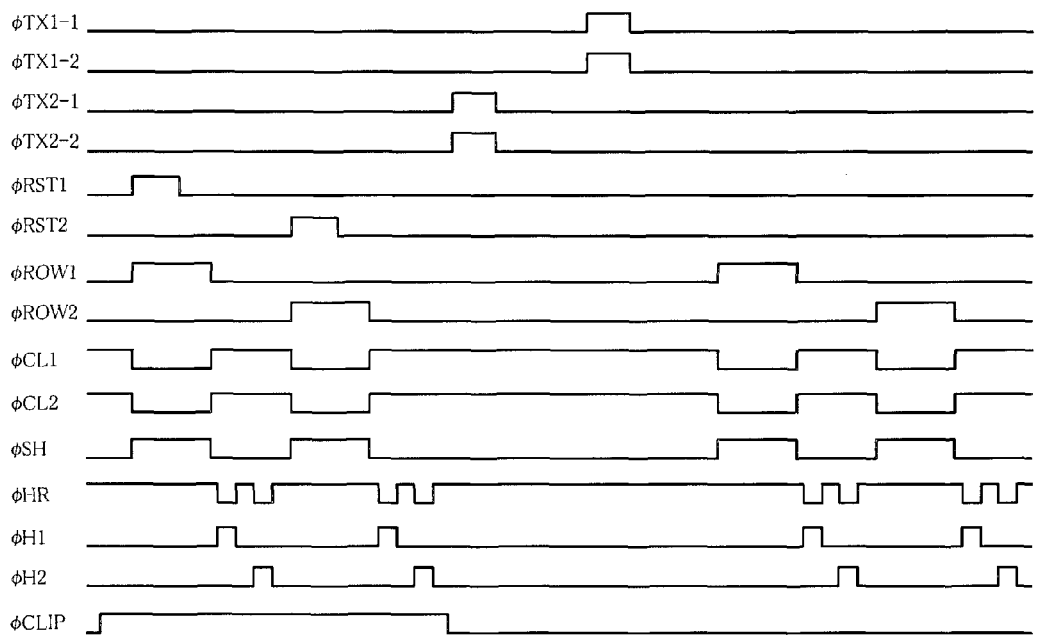
FIG. 11 is a timing chart for explaining operation of the fourth embodiment shown in FIG. 10.

FIG. 11 is a timing chart for explaining operation of the solid-state imaging apparatus according to the fourth embodiment shown in FIG. 10. Also in the present embodiment, it is possible to simultaneously accumulate signal of all pixels, and since column amplifier 14 is used to amplify the reset voltage and the voltage after signal transfer in a similar manner as the third embodiment, the noise components added in the circuit system up to the outputting can be suppressed. Further similarly to the first embodiment, the black sun phenomenon can be suppressed with a simple control by maintaining the clip control pulse φCLIP at H level in the period from start to end of the reading of reset signal of all pixels.

Figure 12:
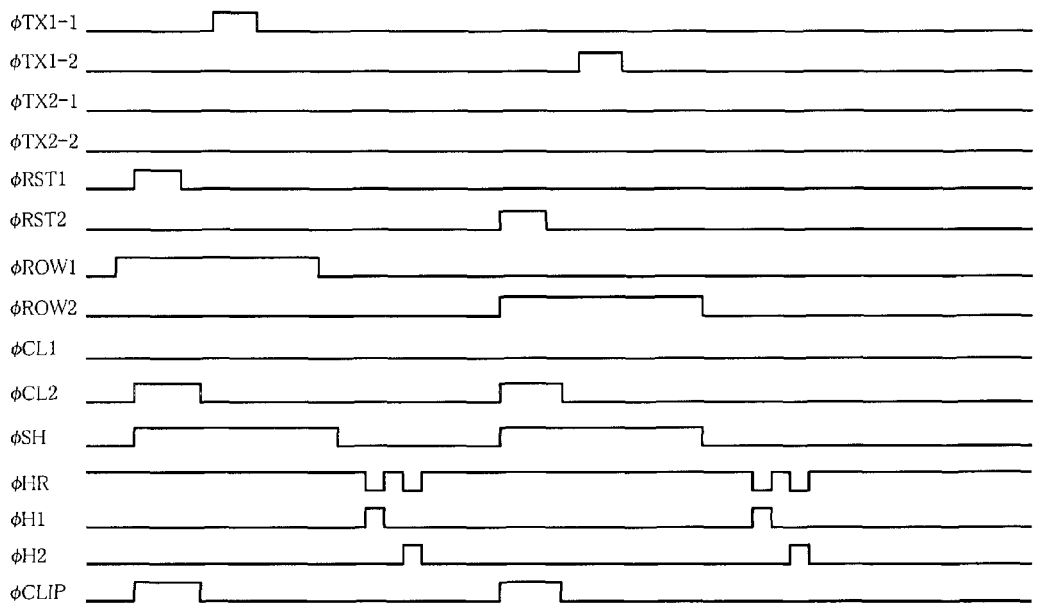
FIG. 12 is a timing chart for explaining another operation of the fourth embodiment shown in FIG. 10.

FIG. 12 is a timing chart showing another operation of the solid-state imaging apparatus according to the fourth embodiment shown in FIG. 10. A description will be given below with noticing signal read operation from the pixel P11 at the first column on the first row. The reset transistor M2 of the first row is turned ON by driving the reset control pulse φRST1 of the first row to H level so as to reset detection signal of memory FD. At the same time, the row select transistor M3 of the first row is turned ON by driving the row select pulse φROW1 of the first row to H level so that reset voltage Vrst of the unit pixel P11 is outputted to the vertical signal line 3-1. Outputted onto the vertical signal line 3-1 is voltage (Vrst−Vgs-M1), i.e. lowered from the reset voltage by threshold voltage Vgs-M1 of the amplification transistor M1. Further, the column amplifier 14 is brought into reset condition and output of the column amplifier 14 is accumulated at the hold capacitor C2 by driving the column amplifier reset pulse φCL2 and the sample-and-hold pulse φSH to H level.

Next, after turning OFF the reset control pulse φRST1 of the first row, the column amplifier reset pulse φCL2 is brought to L level to turn OFF the clamp transistor M14. The reset voltage (Vrn−Vgs-M1−Vrn) containing reset noise Vrn of each pixel is thereby retained at the clamp capacitor C1.

After retaining the reset voltage at the clamp capacitor C1, the transfer transistor M4 of the first row is turned ON by driving the transfer control pulse φTX1-1 of the first row to H level so that the photoelectric conversion signal electric charge accumulated at photodiode PD1 is transferred to the memory FD. The potential of memory FD is changed by amount corresponding to the photoelectric conversion signal voltage Vsig so that it attains (Vrst−Vrn−Vsig), and voltage (Vrst−Vgs-M1−Vrn−Vsig) is outputted onto the vertical signal line 3-1. The output of the column amplifier 14 then attains VC−(1+C3/C4)×(Vsig), i.e. photoelectric conversion signal voltage amplified by (1+C3/C4).

Next, the sample-and-hold pulse φSH is brought to L level to retain the output of the column amplifier 14 at the hold capacitor C2. The voltage after reset and the voltage after signal transfer of the unit pixel P11 are thereby differentiated at the column signal amplification section 11 so that photoelectric conversion signal voltage Vsig is extracted with the reset noise Vrn due to reset transistor M2 and the threshold voltage Vgs-M1 of amplification transistor M1 being removed. Further, since the photoelectric conversion signal is amplified at the column amplifier 14, it is also possible to suppress the noise components that are added in the circuit system after the output of the column signal amplification section 11.

Subsequently, the outputs of the column amplifier 14 retained at the hold capacitors C2 are sequentially read out onto the horizontal signal line 15 by means of horizontal select pulses φH1, φH2 outputted from the horizontal scanning section 14 and is extracted from the output amplifier 16. Further, signal from the output amplifier 16 is converted into digital signal by AD converter 30 which is located within or at the outside of the same chip. When the reading of the first row is complete, the second row is similarly read out.

Further, the clipping circuit 10 is activated to suppress the black sun phenomenon. It is supposed that an intense light has entered the pixel P21 at the first column on the second row. When the reset control pulse φRST2 of the second row is brought to L level, the electric charge leaked into memory FD of the pixel 21 is accumulated. At the same time, the potential of memory FD of the pixel P21 is lowered by Vleak, and the potential of the vertical signal line 3-1 steadily falls.

Here, by maintaining the clip control pulse φCLIP at H level, the clipping transistor M10 is turned ON if the potential of the vertical signal line 3-1 has fallen to (VREF−Vgs-M10), i.e. threshold voltage Vgs-M10 of the clipping transistor M10 subtracted from the clip reference potential VREF. When the clipping transistor M10 is ON, an electric current is supplied to the vertical signal line 3-1 from the clipping circuit 10 so that potential of the vertical signal line 3-1 is kept. Even if the potential of the vertical signal line 3-1 is lowered, it is thus clipped at potential (VREF−Vgs-10) by activating the clipping circuit 10. Therefore, even when the voltage of memory FD after reset voltage is lowered at the time of high luminance, the reset voltage retained at the clamp capacitor C1 is clipped at (VREF−Vgs-M10). For this reason, a sufficient difference voltage is detected and the black sun phenomenon is suppressed even when the voltage after reset and the voltage after signal transfer of the unit pixel P21 of the second row are differentiated at the column signal amplification section 11. Although distortion in moving image occurs due to difference in exposure time from one row to another when operation is effected at the timings shown in FIG. 12 in this manner, a reduction in reading time is possible, since it is not necessary that the reset voltage and the photoelectric conversion signal voltage be read out separately.

In the solid-state imaging apparatus having circuit construction shown in FIG. 10 as the above, switching based on change in operation timing can be made between a row-by-row exposure and a field-simultaneous exposure so that change of operation according to its use/application is possible. Even when change of operation is effected, the black sun phenomenon can be suppressed by changing control of the clipping circuit.

(Embodiment 5)

Figure 13:
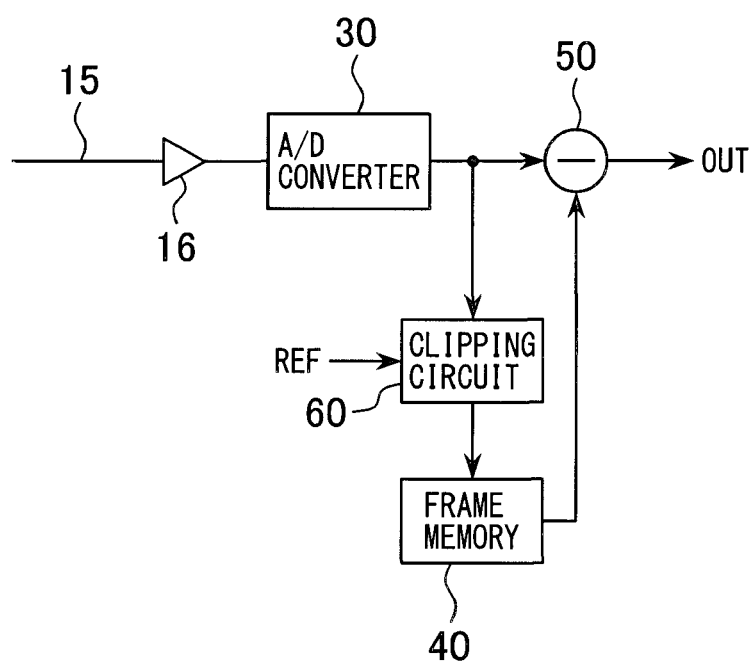
FIG. 13 is a schematic block diagram showing a main portion of the solid-state imaging apparatus according to a fifth embodiment.

A fifth embodiment will now be described. FIG. 13 is a block diagram showing construction of a main portion of the solid-state imaging apparatus according to the fifth embodiment. This embodiment is achieved by providing a clipping circuit 60 between the A/D converter 30 and the frame memory 40 of the first to fourth embodiments, and the rest of its construction is similar to the construction of one or another of the first to fourth embodiments. The clipping circuit 60 in this embodiment is to effect comparison between a signal conversion threshold value REF and the reset voltage of each pixel outputted from A/D converter 30 in digital values so as to replace the reset voltage of that pixel by the signal conversion threshold value REF when the reset voltage is greater than the signal conversion threshold value REF.

In the fifth embodiment having such construction, when reset voltage is changed due to the black sun phenomenon in reading the reset voltage of each pixel at first out to the frame memory 40, it is replaced with the signal conversion threshold value REF by the clipping circuit 60 similarly to the first to fourth embodiments. A suppression of the black sun phenomenon thereby becomes possible. Further, similarly to the first to fourth embodiments, photoelectric conversion signals of the same accumulation period can be obtained for all pixels so that signal outputs with less noise can be obtained. Of the first to fifth embodiments, the clip voltage VREF may be set at an optional value, and it is preferably set lower than the reset voltage Vrst.

In the solid-state imaging apparatus according to the present invention as has been described by way of the above embodiments, having a read mode where the reset level and the level after signal transfer of pixel cell are read out onto the horizontal signal line in time sequence by the unit of frame and subjected to A/D conversion so as to be differentiated in digital value, it is possible to read with less noise the signals of the same accumulation period for all pixels and at the same time to suppress the black sun phenomenon that occurs when high-luminance light enters. The advantages of each aspect are as follows. In the first aspect, since first signal levels and second signal levels are respectively read out at different timings with treating frame as unit, it is possible to suppress the noise and black sun phenomenon at the same time of suppressing distortion in moving image. In the second aspect, it is furthermore possible to acquire second output signal levels that are simultaneous to all pixels. In the third aspect, it is possible to correspond to the clipping operation only with a change of control by the control section. In the fourth and fifth aspects, it is possible to unify the location at which clip means is provided so that the circuits can be simplified. In the sixth aspect, an amplified first or second output signal level can be obtained. In the seventh aspect, a switching is possible correspondingly to application between an acquisition of second output signal level simultaneously of all pixels and an acquisition of second output signal level by treating pixel group arranged in single row in the horizontal direction as unit. In accordance with the eighth aspect, the effect of suppression of the black sun phenomenon can be changed in accordance with setting.

What is claimed is:

1. A solid-state imaging apparatus comprising:

a pixel section where a plurality of pixel cells are two-dimensionally arranged with each having a photoelectric conversion section for generating signal electric charges corresponding to an object image, a memory means for temporarily retaining said signal electric charges, an electric charge transfer means for transferring said signal electric charges generated at said photoelectric conversion section to said memory means, an amplification means for outputting a signal corresponding to an amount of said signal electric charges retained at said memory means, and a reset means for resetting said memory means;

a plurality of vertical signal lines for reading output of said signal from said amplification means along a vertical direction with treating individual one of said pixel cells arranged in a horizontal direction as unit;

a horizontal signal line for reading signals from said plurality of vertical signal lines along the horizontal direction;

an A/D converter for converting output from said horizontal signal line into digital signal;

a frame memory for retaining output signal level of one or the other of a first output signal level of said pixel cell at the time of reset converted into said digital signal and a second output signal level of the pixel cell after transfer by said electric charge transfer means;

a subtracter for computing a difference between said one output signal level retained at said frame memory and the other output signal level;

a clip means for clipping said first output signal level to a predetermined clipping level when said first output signal level is changed more than a predetermined threshold only at the time of reading of said first output signal level;

a control section for executing a frame read mode where a control is effected so as to read said first output signal level and said second output signal level respectively at different timings with treating frame as unit; and a switch connected between a non-inverting input terminal of a column amplifier and a reference voltage terminal that supplies a reference voltage, said switch to fix the non-inverting input terminal to the reference voltage, wherein each one of said vertical signal lines having a second amplification means for amplifying said output signal level from said pixel cell, said second amplification means having an amplifier reset circuit for resetting the column amplifier provided in the second amplification means and to set said vertical signal lines to an amplification reference signal prior to outputting said output signal level to said vertical signal lines for second amplification, and wherein said amplifier reset circuit is connected between an output terminal and an inverting input terminal of said column amplifier and a feedback capacitor connected between said inverting input terminal and said output terminal of said column amplifier, and the amplifier reset circuit allows the output terminal and the inverting input terminal of the column amplifier to short, and the switch is on-state when the column amplifier resets.

2. The solid-state imaging apparatus according to claim 1, wherein said control section causes simultaneous operation of said electric charge transfer means of all pixel cells.

3. The solid-state imaging apparatus according to claim 1, wherein said clip means is connected to said vertical signal lines.

4. The solid-state imaging apparatus according to claim 1, wherein said clip means is connected to said horizontal signal line.

5. The solid-state imaging apparatus according to claim 1, wherein said clip means executes a clipping operation on an output from said A/D converter.

6. The solid-state imaging apparatus according to claim 1, wherein said control section has said frame read mode as a first read mode and in addition has a second read mode where a control is effected so as to read said first output signal level and said second output signal level respectively at different timings with treating pixel group arranged in single row in said horizontal direction as unit, wherein said second amplification means at the time of said second read mode amplifies and outputs said difference between said first output signal level and said second output signal level.

7. The solid-state imaging apparatus according to claim 1, wherein said clip means comprises said clipping level as capable of being changed.

* * * * *